US010817200B2

(12) United States Patent
Murali et al.

(10) Patent No.: US 10,817,200 B2
(45) Date of Patent: Oct. 27, 2020

(54) MEMORY INTERFACE FOR A SECURE NOR FLASH MEMORY

(71) Applicant: Silicon Laboratories Inc., Austin, TX (US)

(72) Inventors: Partha Sarathy Murali, San Jose, CA (US); Venkata Siva Prasad Pulagam, Secunderabad (IN); Sailaja Dharani Naga Sankabathula, San Jose, CA (US); Venkat Rao Gunturu, Hyderabad (IN); Subba Reddy Kallam, Los Altos Hills, CA (US)

(73) Assignee: Silicon Laboratories Inc., Austin, TX (US)

( * ) Notice: Subject to any disclaimer, the term of this patent is extended or adjusted under 35 U.S.C. 154(b) by 124 days.

(21) Appl. No.: 15/794,008

(22) Filed: Oct. 26, 2017

(65) Prior Publication Data

US 2019/0129638 A1 May 2, 2019

(51) Int. Cl.
*G06F 3/06* (2006.01)
*G06F 13/40* (2006.01)

(52) U.S. Cl.
CPC .......... *G06F 3/0637* (2013.01); *G06F 3/0622* (2013.01); *G06F 3/0659* (2013.01); *G06F 3/0679* (2013.01); *G06F 13/4068* (2013.01)

(58) Field of Classification Search
CPC .. G06F 3/0637; G06F 13/4068; G06F 3/0679; G06F 3/0622; G06F 3/0659; G06F 12/1483
See application file for complete search history.

(56) References Cited

U.S. PATENT DOCUMENTS

| | | | |
|---|---|---|---|
| 7,032,081 B1* | 4/2006 | Gefen | G06F 15/7814 711/103 |
| 7,287,140 B1* | 10/2007 | Asanovic | G06F 12/1483 711/163 |
| 2007/0233955 A1 | 10/2007 | Luo et al. | |
| 2012/0255016 A1 | 10/2012 | Sallam | |
| 2014/0297922 A1 | 10/2014 | Sarangdhar et al. | |
| 2014/0372669 A1 | 12/2014 | Kwon et al. | |
| 2017/0185344 A1 | 6/2017 | Kirshenbaum | |
| 2018/0150252 A1* | 5/2018 | Lewis | G11C 5/148 |

* cited by examiner

*Primary Examiner* — David Yi
*Assistant Examiner* — Alan Otto
(74) *Attorney, Agent, or Firm* — File-EE-Patents.com; Jay A. Chesavage (57) ABSTRACT

A flash memory controller is operative to receive serial commands and command arguments. A flash permissions table identifies each segment of flash memory as READ_ONLY, PRIVATE_R/W or OPEN_R/W. A memory interface is coupled to a flash memory and also the flash permissions table. When a flash memory write operation is received with an associated command argument corresponding to an address indicated as READ_ONLY in the flash permissions table and a DISABLE_WR_REG is true, the write operation is ignored or converted into a non-write command and issued to the flash memory.

18 Claims, 5 Drawing Sheets

*Figure 1*
Microcontroller with External Flash

*Figure 2*
Flash Organization

*Figure 3*
Flash Protection

*Figure 4*
Flash Protection

*Figure 5*
SPI Flash Serial Protocol

Figure 6
Flash Permission Table

602:
| Block | Type |
|---|---|
| 0 | READ_ONLY |
| 1 | READ_ONLY |
| 2 | READ_ONLY |
| 3 | READ_ONLY |
| ⋮ | |

604:
| m | PRIVATE_RW |
|---|---|
| m+1 | PRIVATE_RW |
| m+2 | PRIVATE_RW |
| m+3 | PRIVATE_RW |
| ⋮ | |

606:
| n | OPEN_RW |
|---|---|
| n+1 | OPEN_RW |
| n+2 | OPEN_RW |
| n+3 | OPEN_RW |
| ⋮ | |

Figure 7A-1
E-Fuse Table (bootrom)

| FLASH_ROM_0 | 1 |
|---|---|
| FLASH_ROM_1 | 1 |
| FLASH_ROM_2 | 1 |
| FLASH_ROM_3 | 1 |

Figure 7A-2
E-Fuse Table (F_ROM_0)

| FLASH_ROM_0 | 0 |
|---|---|
| FLASH_ROM_1 | 1 |
| FLASH_ROM_2 | 1 |
| FLASH_ROM_3 | 1 |

Figure 7A-3
E-Fuse Table (F_ROM_1)

| FLASH_ROM_0 | 0 |
|---|---|
| FLASH_ROM_1 | 0 |
| FLASH_ROM_2 | 1 |
| FLASH_ROM_3 | 1 |

Figure 7A-4
E-Fuse Table (F_ROM_2)

| FLASH_ROM_0 | 0 |
|---|---|
| FLASH_ROM_1 | 0 |
| FLASH_ROM_2 | 0 |
| FLASH_ROM_3 | 1 |

*Figure 7B*
Flash Protection Process

*Figure 7C*
Flash Protection Process

MEMORY INTERFACE FOR A SECURE NOR FLASH MEMORY

FIELD OF THE INVENTION

The present invention relates to systems and architectures for use with non-volatile computer storage such as flash memory. In particular, the invention relates to an apparatus and method for secure storage of information in a NOR architecture flash memory file system for use in execute-in-place (XIP) applications, in a manner which protects the information stored therein from intrusion, compromise, or unauthorized access.

BACKGROUND OF THE INVENTION

Flash memory is commonly used for storage of executable program files and other persistent information for use by a central processing unit (CPU). When the content of the memory is to be secure, a particular type of NAND flash memory, known as Secure Digital (SD) flash memory is often used. One of the features of SD flash is the provision of blocks of memory which can be written once and becomes read-only thereafter. However, SD flash also requires an entire sequential block of memory to be read at once, which greatly slows down the rate of random access to single locations. NOR flash architectures provide random access required by XIP applications and is available from various vendors, but does not provide a mechanism for ROM-like behavior which is irreversible. ROM-like behavior is important in applications where executable code may be downloaded and stored and the integrity of the executable code is to be preserved by removing the ability to modify it after download. Each manufacturer may have its own mechanism for write protecting flash blocks or segments, each manufacturing requiring that microcontroller firmware be written to support that particular flash protection mechanism. Another problem is that if an exploit application is downloaded into flash memory, it has the same privileges of execution as native code, so it can read private keys and trusted certificates and provide those to outside entities, which creates security vulnerabilities. It is desired to provide an interface which provides dedicated access to flash memory containing a read-only segment for executable code, a protected read/write segment for private information, and an open read/write segment available for temporary storage of downloaded bootrom and other applications.

It is further desired to provide an apparatus and method which preserves the integrity of executable bootrom code in a ROM-like segment while allowing the flexible uploads of bootrom code into writable regions of flash, using a NOR architecture flash memory providing XIP functionality.

OBJECTS OF THE INVENTION

A first object of the invention is a flash memory interface having at least a read only segment, a read/write protected segment, and a general purpose read/write segment.

A second object of the invention is a method for performing flash memory operations in combination with a permissions table and a microcontroller accessing the flash memory through a flash interface which blocks write operations to regions identified in the permissions table as ROM-like segments.

SUMMARY OF THE INVENTION

A memory interface to a NOR flash memory device having a plurality of storage locations is operative with permissions table which identifies segments as at least one of: a first segment in a READ_ONLY memory mode, a second segment in a protected write (PRIVATE_RW) mode, and a third segment in a general purpose read write (OPEN_RW) mode. A flash memory write trap is operative to decode memory operations on a serial command input, compare the operation to the permissions table, and either reissue the flash memory command, prevent the flash memory command from being issued to the flash memory, or modify the flash memory command to a different command which does not result in a write operation to a flash memory segment identified as read only.

BRIEF DESCRIPTION OF THE DRAWINGS

FIGS. 7A-1, 7A-2, 7A-3, 7A-4 show the progression of an E-Fuse table for a series of bootrom upgrades.

DETAILED DESCRIPTION OF THE INVENTION

Figure 1:
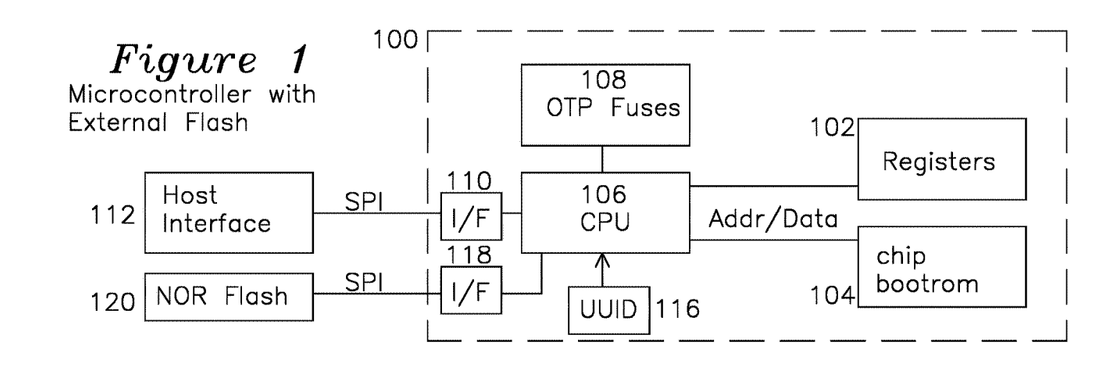
FIG. 1 shows a block diagram for a microcontroller coupled to a flash memory device.

FIG. 1 shows microcontroller 100 which is coupled external flash memory 120 over an interface such as SPI and having a separate SPI host interface 112, which may be used for connection to external resources such as host servers over a Wireless Local Area Network (WLAN), although any interface type may be used.

Flash memory falls into two architectural categories, NOR flash, which has the feature of being randomly accessible for read or write operations, and NAND flash, which can most efficiently be read or written in sequential blocks. Accordingly, the NAND flash architectures provide particular advantages when used as a storage replacement for a hard disk drive, where the data is continuously streamed out of the storage device in block-sized accesses. For this reason, NAND flash is very popular for streaming applications such as hard drive (rotating disk) memory replacement (known as "Flash drives"), camera memory modules ("SD Flash"), and embedded into music players for storage of the streamed music data.

NAND flash is typically read in burst events as individual blocks, such as 512 byte blocks, whereas code execution in a microcontroller is not sequential, and may involve conditional loops or branches redirecting subsequent memory accesses to an earlier or later executable code segment. Accordingly, the NAND flash overhead of reading an entire block of data to access a single byte is not suitable for microcontroller "execute in place" (XIP) applications, where the microprocessor directly executes machine instructions from the flash memory. It is possible to use NAND flash for executable code storage, however the system architecture requires random access memory (RAM), as the microcode sequentially reads the NAND flash as sequential blocks of data, which are then copied into a RAM, and the microcontroller thereafter executes the code directly from the RAM. This makes the microcode less secure, as it can be modified by an exploit after being saved in RAM. Further, in cost sensitive applications, it is preferred to use XIP with NOR flash and no RAM at all for cost savings. However, the NOR flash memory in this configuration can still be written by an exploit which is able to access the region which stores the bootrom.

An example microcontroller chip 100 of FIG. 1 has CPU 106 coupled to a small one-time-programmable (OTP) chip bootrom 104 which contains startup code, CPU registers 102, one time programmable fuses 108, and electrical interfaces 110 and 118 for coupling the microcontroller chip 100 to respective external devices such as a host interface 112 and reprogrammable NOR flash memory 120. The one-time programmable chip bootrom 104 is programmed in a one-time event at time of manufacture with CPU 106 executable CPU instructions which provides for initialization of the registers 102 and interfaces 110 and 118. One time programmable fuses 108 provide an irreversible and sequential method for changing an internally readable state, such that a series of OTP fuses 1 to n which have may be present which are initially closed but may be sequentially programmed to be open after upgrade events. One use of these fuses would be the irreversible indication of where the microcontroller should begin execution after initialization. In this manner, the chip bootrom 102 code may indicate that execution is to jump to a chip bootrom 102 address if a first fuse remains closed, but if the first fuse is open, to read a second fuse, and if the second fuse is closed, to execute from a first flash bootrom 120 location, but if the second fuse is open, to read a third fuse, possibly executing from a second flash bootrom location, etc. In this manner, the microcontroller 106 is able to transfer execution to upgraded bootrom images in the flash bootrom segment of flash in a predetermined manner, with the upgraded bootrom image loaded into the corresponding location for a particular e-fuse. For security purposes, the e-fuses 108 are not capable of being reprogrammed back to their original state.

Flash memory interface 118 may provide direct address mapping such that CPU 106 presents memory addresses to interface 118, which returns associated data from NOR flash 120, thereby allowing the CPU 106 to execute code directly from flash 120 after execution of a branch instruction from the chip bootrom 104. The host interface 112 optionally provides connectivity to other outside resources, which may include network resources including wireless local area network (WLAN) resources, which may be upload updated code modules and other information into the microcontroller 100 upon request.

The microcontroller chip architecture of FIG. 1 provides flexibility in performing memory upgrades from outside sources, and new code may be provided from a remote resource (not shown) through host interface 112 and placed in NOR flash 120 for future execution. However, it is difficult for the CPU to ensure that a code image stored in flash 120 is secure, and many security exploits are in use which subvert the advantages of remote firmware upgrades and compromise the security of the entire system. For example, where code is downloaded from a remote source, a code injection exploit may include unstable executable code elements interspersed with executable code fragments which transmit information about the microcontroller 100 environment to a remote system which may subsequently take control of the subsystem 100 (for example by opening a TCP connection to the remote system and accepting remote execution requests on the TCP port opened for that TCP connection), or to send private information (such as security keys, root certificates, or other certificates of trust) of the flash 114 to hostile remote hosts for unauthorized use. Such exploits have increased in frequency and sophistication over time, and safeguards for them are provided by aspects of the present invention. One approach is to separate the flash interface 118 from other interfaces 110 as shown in FIG. 1, such that NOR flash memory 120 is exclusively accessible through dedicated flash interface 118.

Figures 2, 3:
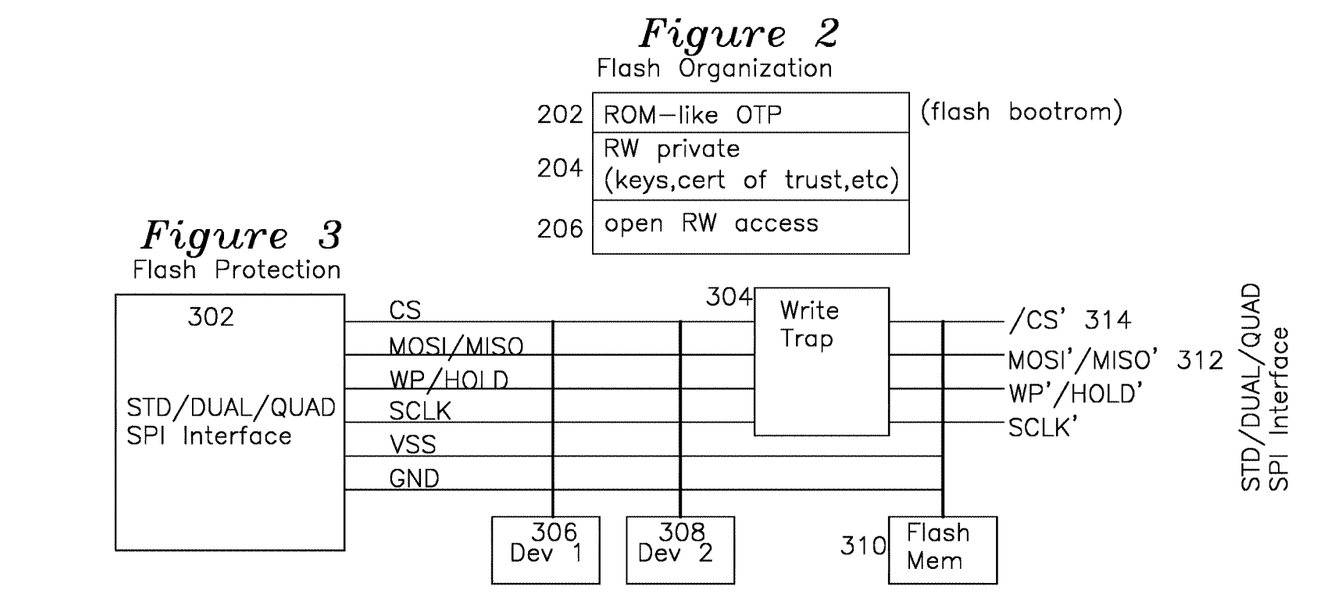
FIG. 2 shows an example organization of flash memory into ROM-like segments, private R/W segments, and open R/W segments.
FIG. 3 shows a block diagram for flash protection architecture on an SPI interface.

FIG. 2 shows a desired organization of flash memory 120 of FIG. 1, where the NOR flash memory 120 is divided into ROM-like one-time programmable partition segment 202, a read/write private segment 204 for the storage and updating of private keys, certificates of trust, hashing algorithms for verification of code images, and the like, and a third open read/write segment 206 for general purpose downloads of code and temporary storage. A mechanism is provided such that the ROM-like one-time-programmable segments can be used for the storage and subsequent execution for flash bootrom purposes, the read/write private segment 204 is only readable by code executing from chip bootrom 104 or flash bootrom 202, and the third segment 206 may be written by code executing from either chip bootrom 104 of flash bootrom 202, but code may not be directly executed from open R/W segment 206 as execution is not allowed to transfer from chip bootrom 104 or flash bootrom 202 by design of the respective bootrom code images. Such a configuration could be accomplished using SD Flash which provides for sector-specific write protection, but this type of NAND flash does not provide for execute in place (XIP) capability for the microcontroller 106. If NOR flash is used, the problem remains of assuring that flash memory 206 has ROM segments 202 which are only accessible by the microcontroller and not modifiable at all, private RW segments 304 which are readable or modifiable only by the local microcontroller 100 only, and which provide that the microcontroller 100 is immune from code injection attacks after code updates of untrusted images delivered across host interface 112, which download into, and execute from segment 206 of FIG. 2.

It is desired to initially program the chip bootrom 104 at time of manufacture with microcode for performing fundamental operations such as initializing the CPU 106, delivering a vector for start of code execution, initializing the interfaces 110, 118, reading or writing one time programmable fuses 108, which may be used to indicate whether to provide a vector for start of code execution that points to chip bootrom 104 or flash bootrom segment 202 of flash memory 120. In one example, the chip bootrom 104 initializes all of the CPU interfaces such as 110 and 118, thereafter reading a first OTP fuse 108. If the first OTP fuse 108 is intact, the chip bootrom 104 contains instructions for the CPU to execute from a particular location in chip bootrom 104, but if the first OTP fuse is open, then a second OTP fuse should be read, if that second OTP fuse is intact, then code execution starts from a particular ROM 202 location in flash memory 120 containing a recently upgraded flash bootrom image. If that second OTP fuse 108 is open, then a third OTP fuse 108 should be read, and if the third OTP fuse 108 is intact, code execution starts at a second flash location 202 of flash memory 120 specified by the chip bootrom 104. Since chip bootrom 104 cannot be re-programmed after factory initialization, this method of pre-allocating upgrade behavior based on e-fuse state and flash bootrom 202 reserved ROM-like address provides a powerful method for successively upgrading the code of the microcontroller 202, such that for each upgrade, the microcontroller 202 receives a new bootrom code image, which is first stored in an open R/W segment 206 without executing the downloaded code, the downloaded bootrom code is verified, and after verification, the downloaded bootrom code is transferred to a segment of the flash bootrom segment 202 that is associated with the execution vector for a particular OTP fuse 108, and the associated OTP fuse 108 is opened, and execution begins from a reset location of the CPU 106, such that the CPU 106 begins execution from chip bootrom 104 and execution transfers to the uploaded and validated ROM segment now in flash bootrom segment 202.

The addresses of future executable images in flash bootrom 206 may be associated with OTP fuses read by chip bootrom 104 in a pre-determined manner, such that after uploading an upgraded image to the open RW segment 206, validating the image, and opening the respective sequential e-fuse (a one-time irreversible event), the subsequent reset operation causes the new code to be executed as the upgraded flash bootrom.

The SPI interface is a synchronous interface for reading and writing addressable devices such as flash memory using a serial interface. In a first mode known as "standard mode", the interface comprises power (VSS, such as 1.2V, 1.8V, or 3.3V), Ground (reference voltage), Serial Clock (SCLK), Master Out Slave In (MOSI) serial data delivered to the memory device, Master In Slave Out (MISO) serial data from the memory device. Additional pins of typical flash memory with SDIO interface are Write Protect (WP) used to prevent write operations to the device, and Reset (RST) for initializing the device. In a second operational mode known as "dual mode", throughput speed is doubled by sending input and output data on the MOSI and MISO lines together (using MOSI as D0, MISO as D1). In a third mode known as "quad mode", four bits of data are transferred together, using [HOLD, WP, MISO, MOSI] bits as [D3, D2, D1, D0] respectively.

Some flash memory provides proprietary method for marking certain segments as "read only", using a "one time programmable" bit, which, once set, prevents that block from being written again. Unfortunately, there is not a common register interface across otherwise compatible flash memory devices and manufacturers for providing this capability, so each flash manufacturer has different mappings of registers containing OTP bits which correspond to different locations and sizes of write-protected blocks. Since the chip bootrom and fuse configuration of the CPU have fixed associations between chip bootrom start vector flash memory location for starting program execution and storing a new downloaded code segments into flash, it is undesirable and inflexible to transfer code execution to flash using a combination of fixed location reset vectors and fuses in the chip bootrom, and external flash devices. It is desired to provide a flexible way to create read-only addresses in a flash memory device, private memory areas in a flash device, and open r/w areas, all co-resident in a single flash device.

FIG. 3 shows a block diagram for a flash write protection trap 304 for an SPI interface 302 (which may be any of standard, dual, or quad mode SPI) coupled to unprotected devices 306 and 308, and protected flash 310, which has signals passing through a write trap function 304. In one example (basic mode) SPI interface, flash memory commands are delivered as 48 bit serial frames using the MOSI hardware line to provide the command, each 48 bit command invoking a subsequent command, such as a device read or device write, which may use any of the first mode, second mode, or third mode serial or parallel data transfers described previously for flash memory. In a second example (dual SPI mode offering 2× data transfer rate over basic mode), SPI flash memory commands are delivered using [MISO, MOSI] signals simultaneously, and in a third example (quad SPI mode offering 4× data transfer rate over basic mode) SPI interface, flash memory commands are delivered using [HOLD, WP, MISO, MOSI]. Other signal lines and protocols may be used, as different manufacturers may implement dual or quad mode different than shown in the example interface of FIG. 3.

Figure 4:
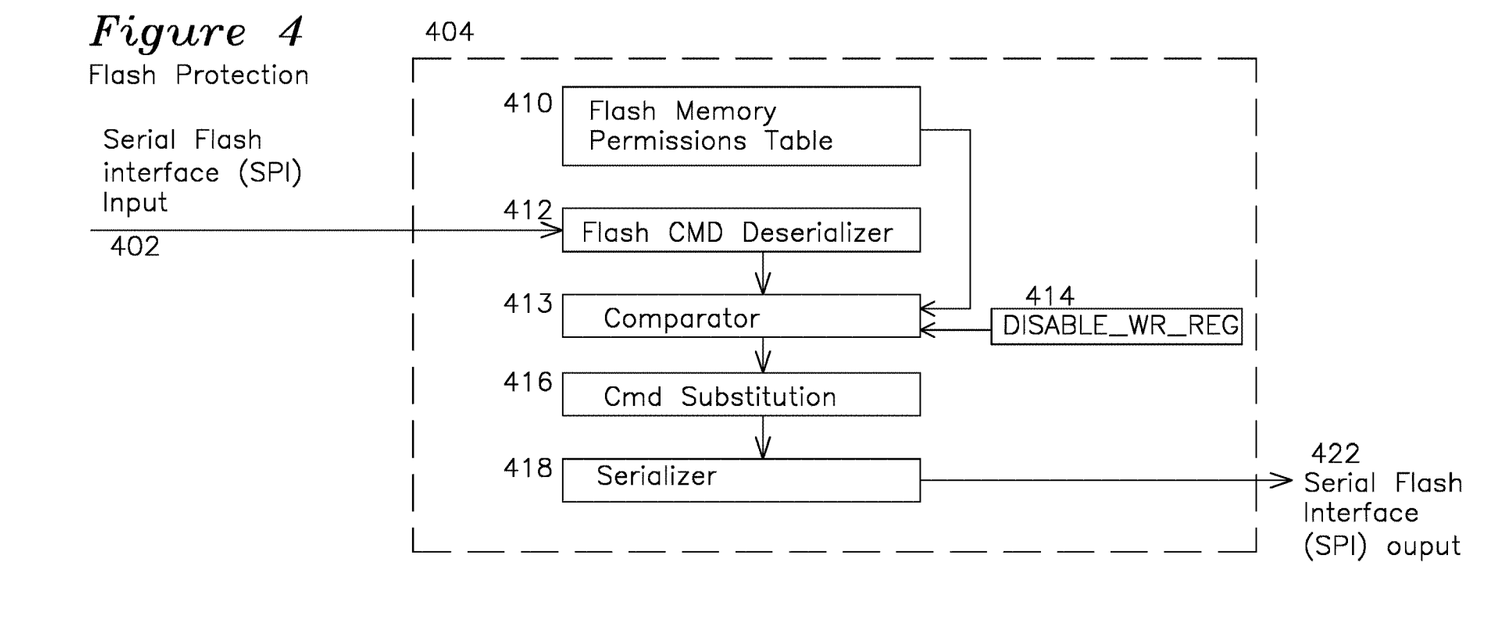
FIG. 4 shows a block diagram for the flash memory write trap of FIG. 3.

FIG. 4 provides additional details for the write trap 304 of FIG. 3, which includes a flash memory permissions register which identifies the usage of particular segments of flash memory 120 as READ_ONLY (202 of FIG. 2), private r/w flash (PRIVATE_RW only readable/writeable by the microcontroller, 204 of FIG. 2), or open flash (OPEN_RW for downloading of code, 206 of FIG. 2).

Figure 6:
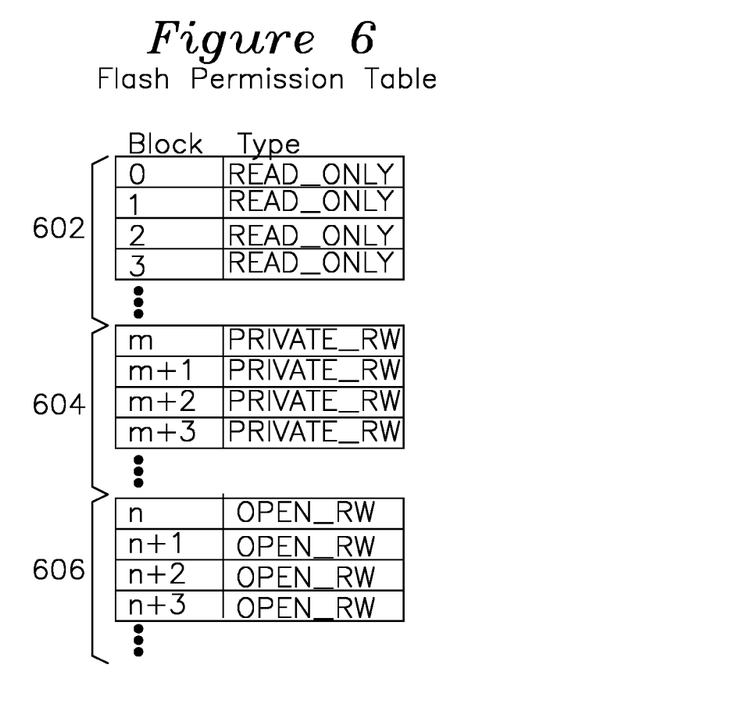
FIG. 6 shows the organization of a flash permissions table.

FIG. 6 shows an example flash permissions table, where segments of memory (such as sectors or other regions of flash memory) are identified as READ_ONLY 602, PRIVATE_RW 604, or OPEN_RW 606. The flash permissions table of FIG. 6 may be stored as a first entry 604 of the flash memory region 204 during a one-time initialization of the flash memory 120, or alternatively, it may be stored in a register accessible to the flash protection 404.

Returning to FIG. 4, the incoming SPI command is serialized 412, which may be a single line MOSI for standard mode, two lines [MISO, MOSI] for dual mode, or four lines for quad mode. Upon deserializing the flash memory command, if the command is a write operation and the DISABLE_WR_REG 414 is enabled, the write operation is ignored by comparator 414. If the command is a write operation and DISABLE_WR_REG is not enabled, the write operation is serialized and transmitted on electrical lines 422 to the flash memory. Other operations unrelated to write operations are permitted without interference.

Figure 5:
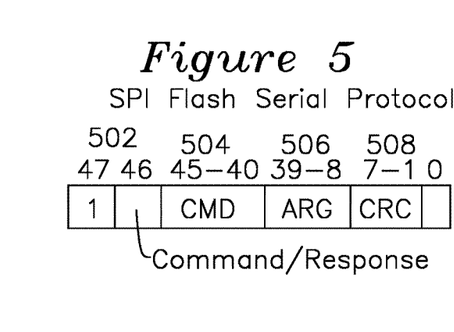
FIG. 5 shows the organization of a flash memory serial command.

FIG. 5 shows a generalized diagram of SPI Flash serial commands, where the command is 48 bits long (split across 1, 2, or 4 lines for standard, dual, and quad modes, respectively), consisting of a command (CMD), an argument (ARG), and an optional error check function (cyclical redundancy check, or CRC). Other serial command protocols are possible, but each flash serial command has an associated command (CMD) and, for a write operation, one or more arguments (ARG).

Figure 7A:
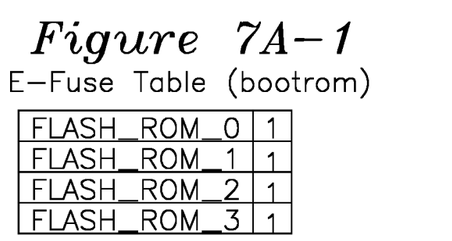
Figure 7A:
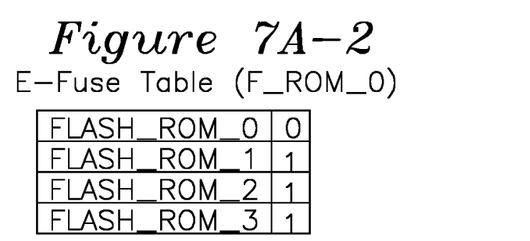
Figure 7A:
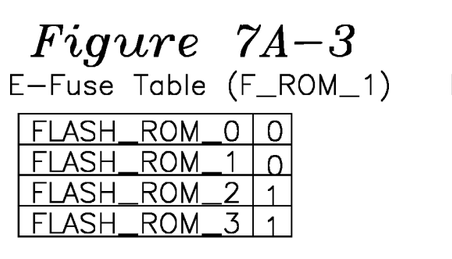
Figure 7A:
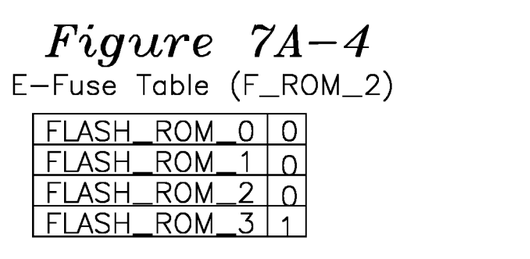

FIG. 7A-1 shows an example e-fuse table in a pristine microcontroller. FLASH_ROM_0 is intact as 1, so no other fuse is read and execution is entirely from the chip bootrom 104. FIG. 7A-2 shows the state of an example e-fuse table after a first bootrom upgrade, FLASH_ROM_0 fuse is now 0, so execution from chip bootrom is transferred from chip bootrom 104 to a particular first location in flash bootrom. FIGS. 7A-3 and 7A-4 show respective second and third flash bootrom upgrades, where execution is transferred from chip bootrom 104 to respective particular third and fourth locations, typically corresponding to upgraded flash bootrom 120 locations.

Figure 7B:
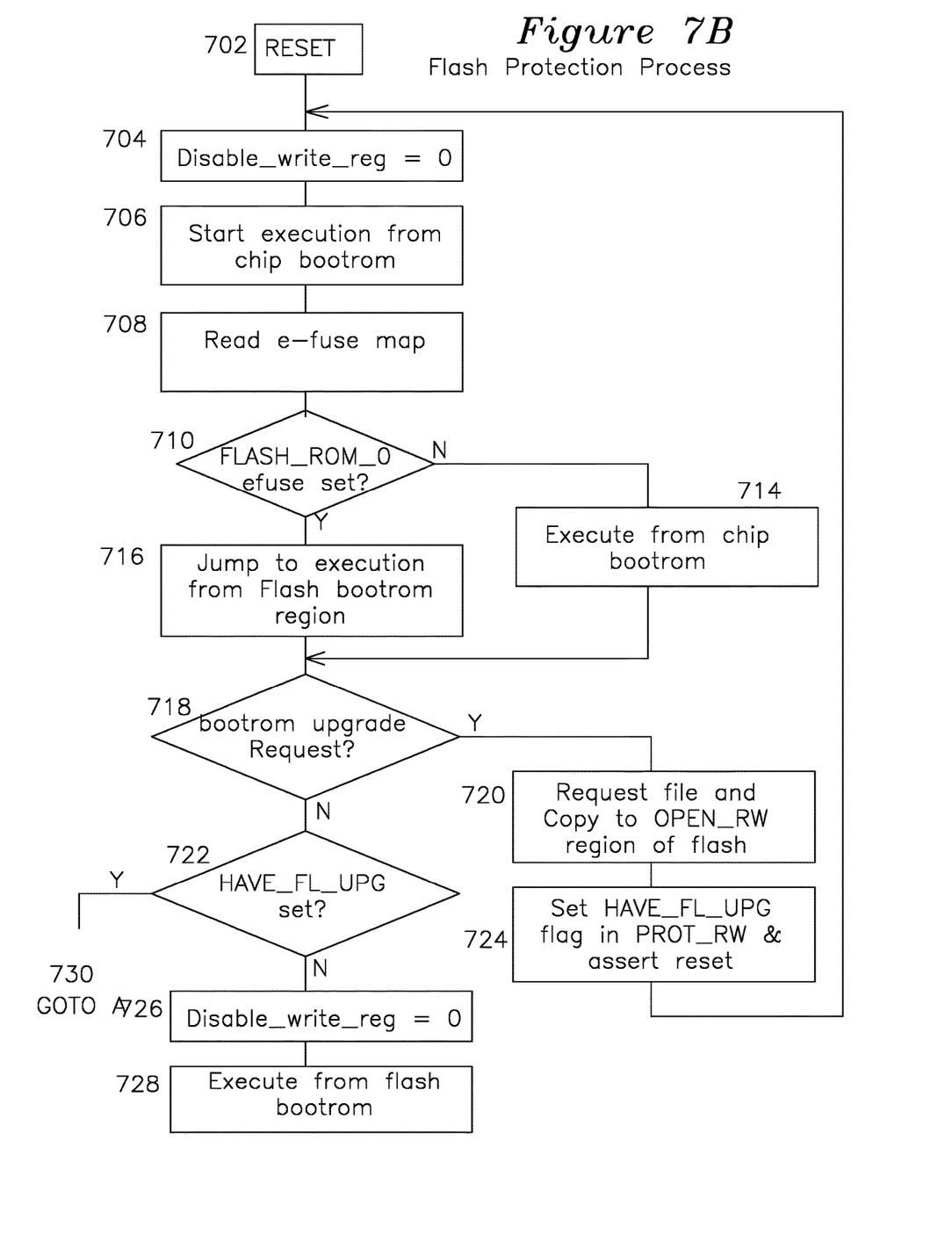
FIGS. 7B and 7C shows a process for a flash protection processor.
Figure 7C:
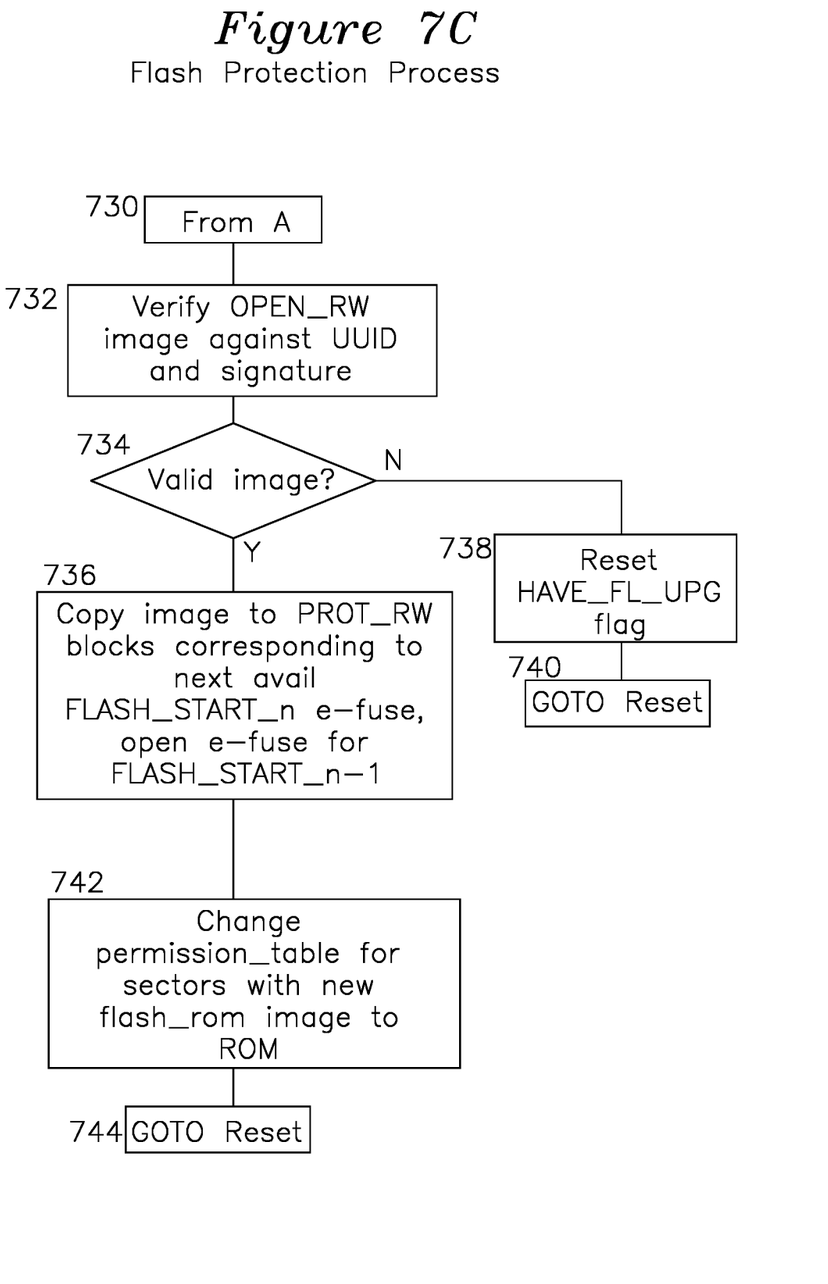

FIGS. 7B and 7C show an example flash protection process operative on the example controllers previously described. Execution begins at step 702 with a reset, which may have resulted from a power-on event, a bootrom download request, or a bootload verification request. The write register is disabled 704, and execution begins from the chip bootrom in step 706. The e-fuse map is read 708, indicating which address (and correspondingly, which bootrom image) to transfer microcode execution. As described previously, for a pristine controller that has never been upgraded, the e-fuse map may look like FIG. 7A-1 and code execution continues in the chip bootrom 104 as shown in step 714. If the e-fuse map is any of FIG. 7A-2, 7A-3, or 7A-4, then execution transfers to the respective bootrom image previously stored in segment 202 of flash bootrom 120 in step 716. If a bootrom upgrade request 718 has been received, the file is requested 720 and the code image is copied to the OPEN_RW region of flash such as 206 of FIG. 2. The code execution in the bootrom merely copies the code image to the OPEN_RW segment, which prevents code exploits from being executed as microcode, as control has not transferred from the chip or flash bootrom code execution during the download and storage to OPEN_RW flash memory. The bootrom code which is executing (either chip bootrom 104 or flash bootrom 120) sets a HAVE_FL_UPG (indicating have flash upgrade) bit in the protected R/W segment of flash memory or register 102, and executes a reset command, which returns execution to 702. Execution starts as before, however in step 722, the HAVE_FL_UPG status bit is detected as set, and control transfers to FIG. 7C step 730. If HAVE_FL_UPG bit is not set, indicating that no flash upgrade has been downloaded, then the DISABLE_WRITE_REG bit 414 is set to 0, and execution continues from flash 728. The DISABLE_WRITE_REG bit 414 of comparator 404 of FIG. 4 prevents any write operations from occurring into the ROM region 202, but allows write operations into the PRIVATE_RW region 204 and OPEN_RW region 206. The DISABLE_WRITE_REG bit thereby prevents write operations to occur in the READ_ONLY used for flash bootrom images while allowing writes to the other regions.

Returning to step 730 after detection of a HAVE_FL_UPG event indicating the presence of a downloaded bootrom image in OPEN_RW for consideration for upgrade, current bootrom image verifies the code image in OPEN_RW is valid using a UUID known only to the bootrom and verifies the signature of the image against a private certificate stored in the protected RW region of flash memory. If the image is valid, then the code image is copied to PRIVATE_RW blocks corresponding to the next available execution location referenced by the FLASH_START_n e-fuse, and the corresponding e-fuse is opened. As described previously, upon the reset 744, the e-fuse map which is read in step 708 after reset 702 will cause the new code image to be executed as the current flash bootrom.

We claim:

1. A memory interface for read/write operations to a flash memory device, the flash memory device having a NOR flash architecture and operative to retrieve non-sequential instructions and not operative to retrieve blocks of sequential data, the memory interface accepting serial commands, at least one serial command including an address argument, the memory interface generating serial commands as output from a received serial command, the memory interface further comprising:
    a flash memory;
    a plurality of one time programmable (OTP) electronic fuses (e-fuses);
    a permissions table indicating a use of each block of said flash memory as at least one of READ_ONLY, PRIVATE_RW, or OPEN_RW;
    a DISABLE_WR_REG for preventing memory writes to a READ_ONLY segment when TRUE and allowing memory writes to a READ_ONLY segment when FALSE; and,
    a write trap processor receiving said serial commands, the write trap processor examining an address segment of the serial command and also the permissions table, and where the serial command is a write operation to an address that the permissions table indicates as READ_ONLY when DISABLE_WR_REG is TRUE, asserting a memory interface output which results in either no operation or a non-write operation to the flash memory associated with the address argument
    the plurality of OTP e-fuses arranged in a list, each OTP e-fuse associated with an address in a block of the permissions table indicated as READ_ONLY;
    the memory interface, upon assertion of an input, examining the list of OTP e-fuses for a first unprogrammed e-fuse, and making a memory read request for the flash memory address associated with the first unprogrammed e-fuse.

2. The memory interface of claim 1 where the permissions table is stored in a segment of the flash memory indicated in the permissions table as PRIVATE_RW.

3. The memory interface of claim 1 where the write trap processor output forms commands for a NOR flash architecture.

4. The memory interface of claim 1 where the memory interface is coupled to a microcontroller, the microcontroller operative to exclusively execute programs which are stored in the READ_ONLY segment of flash memory.

5. The memory interface of claim 4 where the flash memory stores at least one of: private keys or security certificate information in said PRIVATE_R/W flash memory segment.

6. The memory interface of claim 4 where the microcontroller stores remotely downloaded code or data into the OPEN_R/W segment of flash memory.

7. The memory interface of claim 1 where the DISABLE_WR_REG is a value stored in a block of flash memory indicated by said permissions table as PRIVATE_RW.

8. The memory interface of claim 1 where, when said DISABLE_WR_REG is FALSE, the write trap processor transfers each received flash memory serial command to the output port.

9. The memory interface of claim 1 where, when a write operation address corresponds to a PRIVATE_RW or OPEN_RW, the write trap processor transfers each received flash memory command to the output port.

10. A memory interface for read/write flash memory comprising:
    an input port receiving serial flash memory commands;
    an output port for coupling to a flash memory;
    a DISABLE_WR_REGISTER;
    a permissions table indicating a permitted use of each block of a flash memory by address;
    a plurality of one-time programmable (OTP) e-fuses arranged in a list;
    the memory interface examining each serial flash memory command, if the serial flash memory command is a write operation to a particular address, the DISABLE_WR_REGISTER is TRUE, and the permissions table for the particular address indicates a READ_ONLY permission, the memory interface generating a serial flash memory command which does not result in a write operation;
    the memory interface coupled to an execute in place (XIP) flash memory operative to read non-sequential flash memory locations in individual read operations;
    each OTP e-fuse in the list associated with a flash memory address in a block indicated as READ ONLY by the permissions table, the memory interface, upon receipt of a reset input, examining the list of OTP e-fuses for the first unprogrammed e-fuse in the list and making a read request for the address associated with the first unprogrammed e-fuse.

11. The memory interface of claim 10 where, when said permissions table indicates said particular address corresponds to a PRIVATE_RW or OPEN_RW permission, the memory interface outputting said serial flash memory command to said output port.

12. The memory interface of claim 10 where, when said serial flash memory command is not a write operation, the memory interface directs the flash memory command to the output port.

13. The memory interface of claim 10 where, when said serial flash memory command is a write operation and said DISABLE_WR_REGISTER is FALSE, the memory interface directs the flash memory command to the output port.

14. The memory interface of claim 10 where said memory interface is operative for NOR flash memory.

15. The memory interface of claim 10 where said memory interface is coupled to a microcontroller, the microcontroller operative to exclusively execute programs which are stored in a READ_ONLY segment of flash memory.

16. A process for maintaining the integrity of a flash memory, the process operative with a permissions table, a DISABLE_WR_REG register, a list of one-time programmable (OTP) electronic fuses (e-fuses) arranged in a list, each OTP e-fuse associated with an address in flash memory, the process operative to receive serial flash memory operations and to output modified flash memory operations, the process comprising:
  receiving a flash memory operation which includes an address and an indication of whether the operation is a write operation;
  if the DISABLE_WR_REG register is FALSE, outputting the flash memory operation without modification;
  if the DISABLE_WR_REG register is TRUE and the flash memory operation is a write operation, examining the permissions table to determine whether a corresponding memory segment in the permissions table is READ_ONLY, outputting a modified flash memory operation which is not a write operation;
  the flash memory being a NOR architecture and operative only for single location read operations and not operative for multiple sequential read operations in a single read operation;
  upon receipt of a program reset request, examining the list of OTP e-fuses until a first unprogrammed e-fuse is encountered, and thereafter making a read request for an address in a memory segment indicated in the permissions table as READ ONLY and associated with the first unprogrammed e-fuse.

17. The process of claim 16 where the modified flash memory operation is not outputting anything.

18. The process of claim 16 where the DISABLE_WR_REG is a register in a PRIVATE_RW region of a flash memory.

* * * * *